United States Patent [19]

Kruelskie

[11] 3,914,085

[45] Oct. 21, 1975

[54] EXTRUSION APPARATUS

[75] Inventor: Donald A. Kruelskie, Wheelersburg, Ohio

[73] Assignee: The Dow Chemical Company, Midland, Mich.

[22] Filed: Jan. 7, 1974

[21] Appl. No.: 431,273

Related U.S. Application Data

[63] Continuation of Ser. No. 255,270, May 22, 1972, abandoned.

[52] U.S. Cl............. 425/380; 425/381; 425/817 C; 425/466
[51] Int. Cl.²...................... B29D 7/04; B29F 3/04
[58] Field of Search........ 425/4 C, 817 C, 192, 381, 425/466, 380, 817 C; 249/157, 49; 164/280, 164/273 R

[56] References Cited
UNITED STATES PATENTS 1,504,580  8/1924  Rowe .............................. 249/157 X
3,289,257  12/1966  Richards ..................... 164/273 R X Primary Examiner—Robert D. Baldwin
Assistant Examiner—Mark Rosenbaum
Attorney, Agent, or Firm—Robert B. Ingraham

[57] ABSTRACT

A readily adjusted foam extrusion apparatus is provided which comprises a conventional foam extruder having guide plates or shaping members which are readily adjusted to form a rectangular opening of the desired size without the necessity of interrupting the extrusion operation.

7 Claims, 3 Drawing Figures

EXTRUSION APPARATUS

This application is a continuing application of my co-pending application Ser. No. 255,270, filed May 22, 1972, now abandoned.

In the extrusion of synthetic resinous thermoplastic cellular polymers it is frequently desired to provide a guiding or shaping orifice adjacent the extrusion orifice in order to control the expansion of the extruded foam. Some such devices are shown in U.S. Pat. Nos. 2,537,977 and 2,740,157, the teachings of which are herewith incorporated by reference thereto. Other devices generally similar in nature employ curved plates as well as planar plates. Oftentimes it is particularly desirable to alter the spacing of such forming members to provide differing degrees of guidance of the extruded foam to vary the size of the extruded product as the size of the die opening is varied. Heretofore such guide means have been adjustable only with substantial difficulty.

It would be desirable if there were available an improved guide means for use in the extrusion of extrudable foamable thermoplastic synthetic resins.

It would also be desirable if such apparatus could readily be adjusted generally independently of the extrusion operation.

It would further be desirable if such a device were available which would permit the provision of a generally rectangular guide means of variable height and width.

These benefits and other advantages in accordance with the present invention are achieved in an extrusion apparatus suitable for the extrusion of a heat plastified synthetic resinous foamable extrudable composition, the apparatus comprising a die adapted to receive heat plastified foamable material and extrude such material through a generally polygonal, and beneficially an elongate rectangular, slot or extrusion orifice having opposed edges, the die having a die face containing said extrusion orifice, first and second support means affixed adjacent the die face, adjustably supported in said support means first and second guide assembly portions, respectively, each assembly comprising a first assembly member adjustably supported in the support member, a first guiding member adjustably supported in the first assembly member and movable in a direction generally normal to the first support member, a second guide member adjustably supported on said first guide member and movable in a direction generally normal to the direction of motion of the first guide member and generally parallel to the motion of the first support member, the first and second guide assemblies being in facing oppositely disposed relationship and adjustable to form a passage of generally rectangular cross-sectional configuration about the die opening and external to the die.

Further features and advantages of the present invention will become more apparent from the following specification taken in connection with the drawing wherein.

Figure 1:
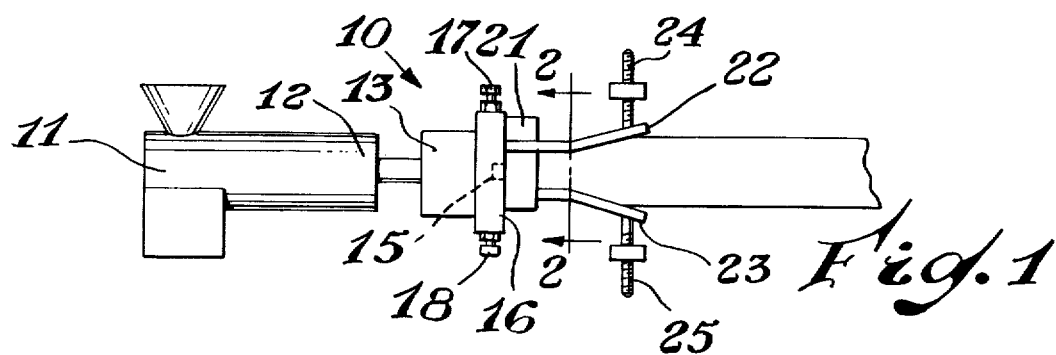
FIG. 1 is a schematic representation of extrusion operation employing apparatus of the invention.

In FIG. 1 there is schematically depicted an apparatus in accordance with the present invention generally designated by the reference numeral 10. The apparatus 10 comprises in operative combination a source 11 of heat plastified synthetic resinous expandable thermoplastic material such as an extruder. The extruder or source 11 has a discharge end 12 in operative combination with a die member 13. The die 13 is adapted to receive the heat plastified thermoplastic expandable or foaming material from the discharge end 12 of the extruder 11 and discharge the foamable material from an elongate slot or extrusion orifice 15 defined in a die face 16 of the die 13 having a first and second pair of opposed sides. The die 13 has orifice adjusting means 17 and 18 adapted to vary the width or height of the elongate slot 15. An extrude sizing or guide assembly 21 is affixed to the die face 16. The assembly 21 effectively provides a channel having a generally rectangular configuration on variable cross-section. Affixed to the assembly 21 and remote from the die face 16 is a first forming member 22 and a second forming member 23. The members 22 and 23 are pivotally attached to the guide means 21 and are positioned by the positioning means 24 and 25. The positioning means 24 and 25 beneficially are linear positioners such as screws, hydraulic cylinders and the like.

Figure 2:
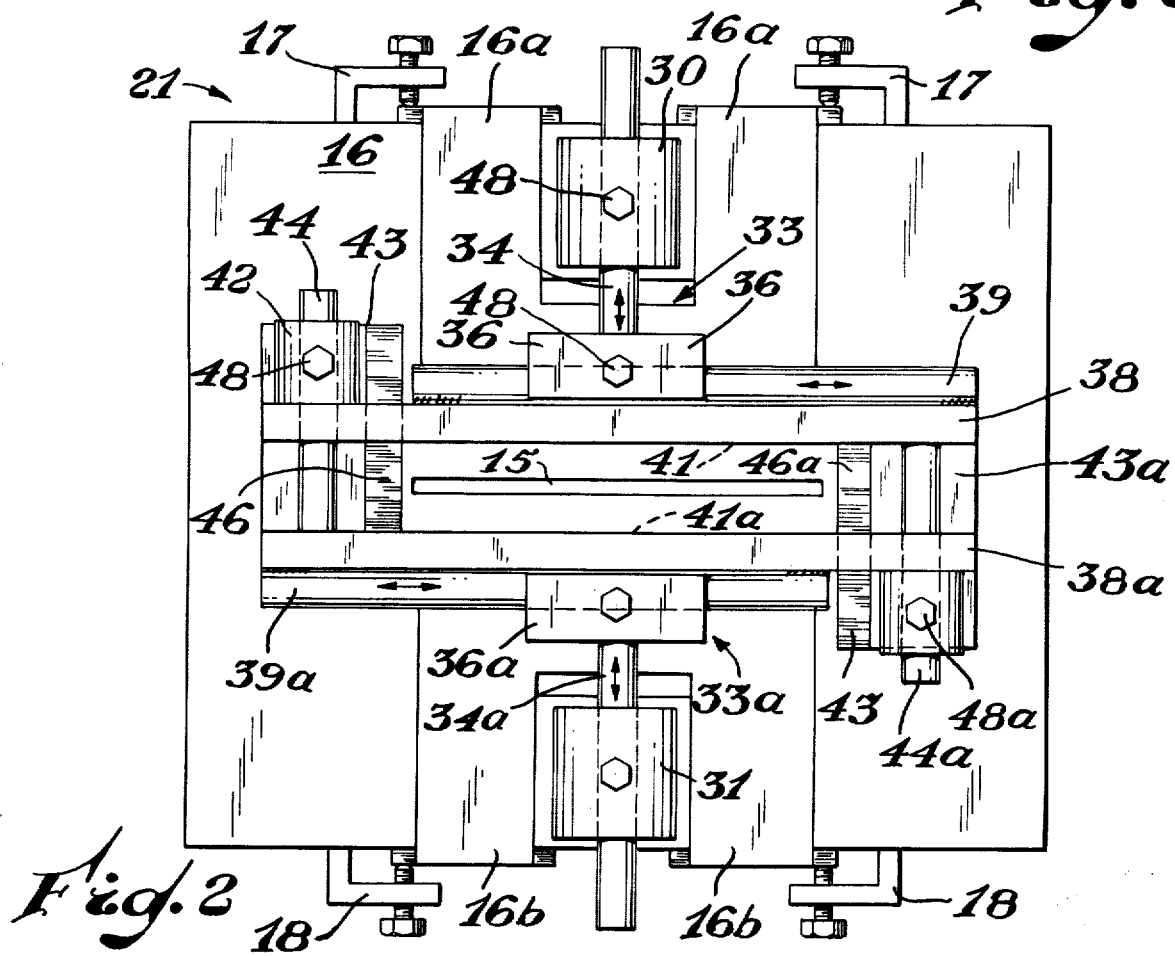
FIG. 2 is a simplified schematic representation of a guide assembly in accordance with the present invention.

In FIG. 2 there is schematically depicted a more detailed front view of the assembly 21 taken along the line 2—2 of FIG. 1 showing the positioning of the assembly on the die face 16. The die face 16 defines an adjustable die orifice 15 defined within the die face by means of slidably mounted die plates 16a and 16b retained within the die plate 16 by retaining means such as dove tails. An adjusting means 17 is in operative combination with the plate 16a. A second adjusting means 18 is in operative combination with the plate 16b permitting motion generally in the plane of the plate to vary the opening of the orifice 15. A first support means 30 and a second support means 31 are rigidly affixed to the die face 16 and are disposed generally on opposite sides of the elongate opening 15. The support 30 has slidably supported therein a first shaping assembly 33. The shaping assembly 33 comprises a first shaping assembly support member 34 adjustably mounted to the first support 30. The first shaping assembly support member 34 carries at one end thereof adjacent the opening 15 a first movable support 36 which is movable in a direction generally normal to a longitudinal axis of the orifice 15 and generally parallel to the die face 16. A first guide or shaping member 38 having a generally planar configuration is movably supported within the support 36 by a spline or way 39 rigidly affixed thereto. The first shaping member 38 is movable in a direction generally parallel to the longitudinal axis of the orifice 15 and in a plane generally parallel to the die face 16. The shaping member 38 has a forming face 41 which is more or less generally perpendicular to the die face 16. The shaping member 38 has rigidly affixed thereto a support means 42. Generally adjacent one end thereof the support means 42 carries a second shaping member 43 slidably affixed in the support 42. The shaping means 43 extends and is movable in a direction generally perpendicular to the major axis of the orifice 15 and in a plane generally parallel to the die face 16 by means of a spline 44 slidably carried by the support 42 and rigidly affixed to the second forming member 43. The second forming member 43 has a foam engaging or guiding face 46 which is generally perpendicular to the face 41 of the first guiding member 38 and outwardly extends from the die face 16. Motion of the support 34, the splines 39 and 44 are indicated by the double headed arrows. Locking means 48 are provided to selectively permit or prevent motion of the members 34, 39 or 44. A second forming assembly 33a is oppositely disposed to the assembly 33 and is slidably supported in the support means 31. The assemblies 33 and 33a may be of identical construction and corresponding parts are designated by the appropriate reference numeral having the suffix a.

Figure 3:
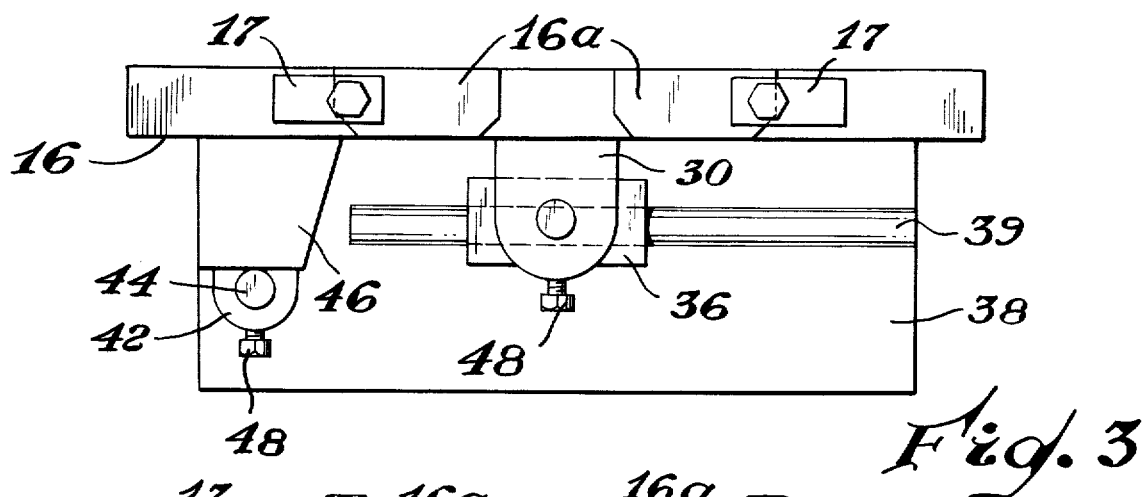
FIG. 3 is a top view of the guide of FIG. 2.

In FIG. 3 there is schematically depicted a top view of the shaping means 21 with the adjustment 17 removed.

In operation of the apparatus in accordance with the present invention, synthetic resinous foamable material is extruded through the orifice 15 and the supports 34 and 34a are adjusted to provide the desired separation between the surfaces 41 and 41a of the first guide means 38 and 38a, thus providing a suitable adjustment for the height of the channel formed by the four guiding members 38, 38a, 43 and 43a. By moving the spline members 39 and 39a, the second guide members 43 and 43a are readily adjusted to provide the desired separation or width of the passage. For example, referring to FIG. 2 if it is desired to reduce the height of the passage between the guiding members 38 and 38a, the second guiding means 43 and 43a are moved upwardly and downwardly, respectively, beneficially to provide only a sufficient portion of the guiding member 43 projecting below the surface 41 to equal the height of the desired opening. In a similar manner, the member 43a is moved downwardly to provide a like upward projection. The members 34 and/or 34a are then adjusted to cause the member 43 to meet or at least closely approach the member 38a and the member 43a to meet or approach the member 38. Thus the guiding members are symmetrically or asymmetrically disposed around the extrusion orifice Such adjustments are readily performed during extrusion without the necessity of interrupting the extrusion operation.

Due to the number of adjustments and components a simple embodiment has been chosen for illustration in order to assure that the basic operation of such an apparatus is readily understood. For applications requiring rigidity, the cylindrical supports and splines beneficially are replaced with dovetails and the guiding members positioned by means of a screw in a manner substantially identical to the positioning of a lathe cross-slide. Beneficially, employing apparatus in accordance with the present invention adjustment of the forming means are readily achieved employing the foamed plastic extrusion.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not be construed or interpreted as being restrictive or otherwise limiting of the present invention.

I claim:

1. An extrusion apparatus (10) suited to extrude a heat plastified synthetic resinous foamable extrudable composition, the apparatus comprising
   a die (13) adapted to receive heat plastified foamable material and extrude such material through a generally polygonal extrusion orifice (15) having opposed edges, the die (13) having
   a die face (16) containing said polygonal extrusion orifice (15),
   a first support means (30) and
   a second support means (31) both affixed adjacent the die face and disposed on opposite sides of the orifice (15), at least
   first (33) and
   second shaping assemblies (33a) adjustably supported by said first and second support means, respectively, each shaping assembly comprising
   a first assembly support member (34, 34a) adjustably supported in the support means (30 and 31),
   a first shaping member (38, 38a) adjustably supported in the first assembly member (34, 34a) and moveable in a direction generally normal to the first support member (34, 34a), and
   a second shaping member (43, 43a) adjustably supported on said first shaping member (38, 38a) and moveable in a direction generally normal to the direction of motion of the first shaping member (38, 38a) and generally parallel to the motion of the first assembly member (34, 34a), the first (33) and second guide assemblies (33a) being in facing oppositely disposed relationship and adjustable to form a passage of generally rectangular cross-sectional configuration about the extrusion orifice (15) and external to the die (13).

2. The apparatus of claim 1 wherein the second shaping members (43, 43a) have surfaces generally diverging outwardly from the die face.

3. The apparatus of claim 1 including first (22) and second (23) forming members pivotally affixed to the first guiding member (38, 38a) of each assembly.

4. The apparatus of claim 3 including a means (16a, 16b, 17) defining an adjustable die opening.

5. The apparatus of claim 4 wherein said die orifice is a generally rectangular configuration.

6. The apparatus of claim 5 wherein the die orifice has an elongate rectangular configuration.

7. The apparatus of claim 1 including means (11) to provide a heat plastified synthetic resinous foamable extrudable composition to the die.

* * * * *